US011763557B1

(12) United States Patent
Emerick

(10) Patent No.: US 11,763,557 B1
(45) Date of Patent: Sep. 19, 2023

(54) PERMANENT CROP AND PERMANENT CROPLAND ANALYSIS USING AERIAL VEHICLES

(71) Applicant: Sentera, Inc., Minneapolis, MN (US)

(72) Inventor: Gregory Emerick, Minneapolis, MN (US)

(73) Assignee: Sentera, Inc., St. Paul, MN (US)

( * ) Notice: Subject to any disclaimer, the term of this patent is extended or adjusted under 35 U.S.C. 154(b) by 451 days.

(21) Appl. No.: 17/028,243

(22) Filed: Sep. 22, 2020

(51) Int. Cl.
*G06V 20/10* (2022.01)
*G06T 3/40* (2006.01)
*B64C 39/02* (2023.01)
*B64U 10/13* (2023.01)
*B64U 101/30* (2023.01)

(52) U.S. Cl.
CPC .......... *G06V 20/188* (2022.01); *B64C 39/024* (2013.01); *G06T 3/4038* (2013.01); *B64U 10/13* (2023.01); *B64U 2101/30* (2023.01)

(58) Field of Classification Search
CPC ... G06V 20/188; B64C 39/024; G06T 3/4038; B64U 10/13; B64U 2101/30
USPC ........................................................ 382/110
See application file for complete search history.

(56) References Cited

U.S. PATENT DOCUMENTS

| 10,402,942 | B2 | 9/2019 | Taipale et al. | |
|---|---|---|---|---|
| 11,321,943 | B2* | 5/2022 | Guo | G06V 10/82 |
| 11,533,862 | B2* | 12/2022 | Gillberg | C12Q 1/6895 |
| 2016/0086032 | A1* | 3/2016 | Pickett | G06T 1/0007 |
| | | | | 382/110 |
| 2018/0253600 | A1* | 9/2018 | Ganssle | G06V 20/188 |
| 2019/0124826 | A1* | 5/2019 | Pickett | A01C 23/02 |
| 2019/0228224 | A1* | 7/2019 | Guo | G06N 3/045 |
| 2019/0325467 | A1* | 10/2019 | Perry | G06Q 30/0605 |

FOREIGN PATENT DOCUMENTS

| CN | 107229999 | * | 10/2017 | ............. G06Q 10/04 |
|---|---|---|---|---|
| CN | 108205718 | * | 6/2018 | ............. G06Q 10/04 |
| CN | 110243406 | * | 9/2019 | ............. G01W 1/02 |
| CN | 111062358 | * | 4/2020 | ........... G06V 20/188 |
| CN | 111372446 | * | 7/2020 | .......... A01M 7/0089 |
| EP | 3476216 | * | 5/2019 | ............. A01M 7/00 |
| JP | 2003006612 | * | 1/2003 | ............. G06F 17/60 |
| WO | WO2014120887 | * | 1/2013 | ............. A01B 79/00 |
| WO | WO2020084384 | * | 4/2020 | ........... G06Q 10/083 |

* cited by examiner

*Primary Examiner* — Jerome Grant, II
(74) *Attorney, Agent, or Firm* — Hamre, Schumann, Mueller & Larson, P.C.

(57) ABSTRACT

One or more images are used to analyze permanent cropland. The images can be obtained from one or more sensors on an aerial vehicle including, but not limited to, UAVs. The analysis of the permanent cropland includes, but is not limited to, analyzing the plants growing in the permanent cropland or analyzing the permanent crops growing on the plants. In one embodiment, the analysis can include estimating a total yield of the permanent crops where the estimated permanent crop yield is more accurate than the estimated yield obtained using traditional methods.

24 Claims, 7 Drawing Sheets

PERMANENT CROP AND PERMANENT CROPLAND ANALYSIS USING AERIAL VEHICLES

FIELD

This technical disclosure relates to permanent cropland, and aerial imaging of plants on the permanent cropland that generate permanent crops and techniques for analyzing the permanent cropland based on one or more images obtained from one or more sensors on aerial vehicles including, but not limited to, unmanned aerial vehicles (UAVs).

BACKGROUND

Permanent crops are crops produced from plants which last for many growing seasons rather than being replanted after each harvest. It is often the case that a grower of permanent crops does not have detailed knowledge of the number of plants in a field (referred to as permanent cropland), the health of the plants, and the potential yield of the permanent crop from the field. One known technique to obtain information on the plants is to have a vehicle drive between two rows of the plants and workers riding on the vehicle are assigned to count the plants and/or visually inspect the plants as the vehicle drives along the row. However, this technique is prone to errors, lacks precision and is very time consuming.

Managers/owners of permanent cropland realize financial benefit by selling futures options on their permanent crops (e.g. apples, oranges, nuts). In some cases, they have contracts with processors with incentives for quantity and quality. If they increase their confidence in crop yield estimation, they can increase the volume of futures options they sell, or they can provide better reporting to shareholders, providing higher confidence in operational accuracy and better share prices. Current practice for permanent crop yield estimation is for managers/owners to select 3-10 "average" plants or sentinel plants, pick all the crop from the sentinel plants, count the crop from the sentinel plants, assess the size of the individual fruits/nuts/etc., compute an average yield per plant, then multiply the average yield per plant by the number of plants in the permanent cropland to produce an estimated yield for the cropland.

SUMMARY

Techniques are described herein for using one or more images to analyze permanent cropland. The images can be obtained from one or more sensors on an aerial vehicle including, but not limited to, UAVs. The sensors can be one or more multispectral sensors/cameras and/or one or more cameras that capture photographic images. The analysis of the permanent cropland includes, but is not limited to, analyzing the plants growing in the permanent cropland or analyzing the permanent crops growing on the plants. In one embodiment, the analysis can include estimating a total yield of the permanent crops where the estimated permanent crop yield is more accurate than the estimated yield obtained using traditional methods.

As used herein, the term "permanent cropland" refers to land on which plants are used to grow permanent crops. The term "permanent crops" refers to crops grown on plants which last for many growing seasons rather than being replanted after each harvest. Examples of permanent cropland include, but are not limited to, vineyards on which grape vines grow grapes; orchards in which trees or plants are used to grow fruits such as peaches, pears, apples, oranges, olives and the like; plantations in which bushes or plants are used to grow, for example, bananas or other fruits; orchards in which trees or plants are used to grow nuts including, but not limited to, almonds, pecans, walnuts, and the like.

In one example described herein, a method of estimating yield of permanent cropland containing a plurality of plants that generate a permanent crop is provided. The method includes receiving at least one image of the permanent cropland that is obtained using at least one sensor on an aerial vehicle, processing the at least one image and assigning the plants to plant classes, estimating a yield of the permanent crop in each plant class, using the estimated yield of the permanent crop in each plant class to estimate the yield of the permanent crop for the permanent cropland, and storing the estimated yield of the permanent crop for the permanent cropland in at least one non-transitory computer readable storage medium.

In another example, a method of estimating yield of permanent cropland containing a plurality of plants that generate a permanent crop is provided. The method includes receiving at least one image of the permanent cropland, processing the at least one image to identify individual ones of the plants, designating one of the identified plants as a sentinel plant, estimating a yield of the permanent crop from the sentinel plant, and using the estimated yield of the permanent crop from the sentinel plant to estimate the yield of the permanent crop for the permanent cropland. The estimated yield of the permanent crop for the permanent cropland may be stored in at least one non-transitory computer readable storage medium.

In another example described herein, a method of estimating yield of a permanent cropland containing a plurality of plants that generate a permanent crop is provided. The method includes receiving a plurality of images of the permanent cropland obtained by one or more multispectral sensors on an aerial vehicle flown over the permanent cropland, processing the plurality of images and generating a mosaic image of the permanent cropland from the plurality of images, and identifying individual ones of the plants in the mosaic image and assigning the plants to plant classes. For each plant class, at least one plant in the plant class is identified and the permanent crop yield for the at least one plant is estimated. For each plant class, a yield of the permanent crop in the plant class is estimated using the estimated permanent crop yield for the at least one plant in the plant class. Thereafter, the estimated yield of the permanent crop in each plant class is used to estimate the yield of the permanent crop for the permanent cropland. The estimated yield of the permanent crop for the permanent cropland is then stored in at least one non-transitory computer readable storage medium.

In another example described herein, a method of estimating yield of plants that generate a permanent crop is provided. The method includes receiving a plurality of images of the plants, where the plurality of images are obtained by one or more multispectral sensors on an aerial vehicle. The plurality of images are then processed to generate a mosaic image from the plurality of images. Individual ones of the plants in the mosaic image are then identified and the plants are assigned to plant classes. For each plant class, at least one plant in the plant class is identified and the permanent crop yield for the at least one plant is estimated. For each plant class, a yield of the permanent crop in the plant class is estimated using the estimated permanent crop yield for the at least one plant in the plant class. The estimated yield of the permanent crop in each plant class is then used to estimate the total yield of the permanent crop for all of the plants. The estimated total yield of the permanent crop is then stored in at least one non-transitory computer readable storage medium.

In another example described herein, a permanent crop estimation system is provided. The system includes one or more processors, which can be one or more CPUs, GPUs and combinations thereof, and one or more storage devices comprising programmed instructions, which when executed by the one or more processors, configure the one or more processors to execute any one of the methods described herein. The system may also include a UAV with at least one sensor, such as a multispectral sensor, mounted thereon that is used to obtain the images of the permanent cropland.

DRAWINGS

Figure 3:
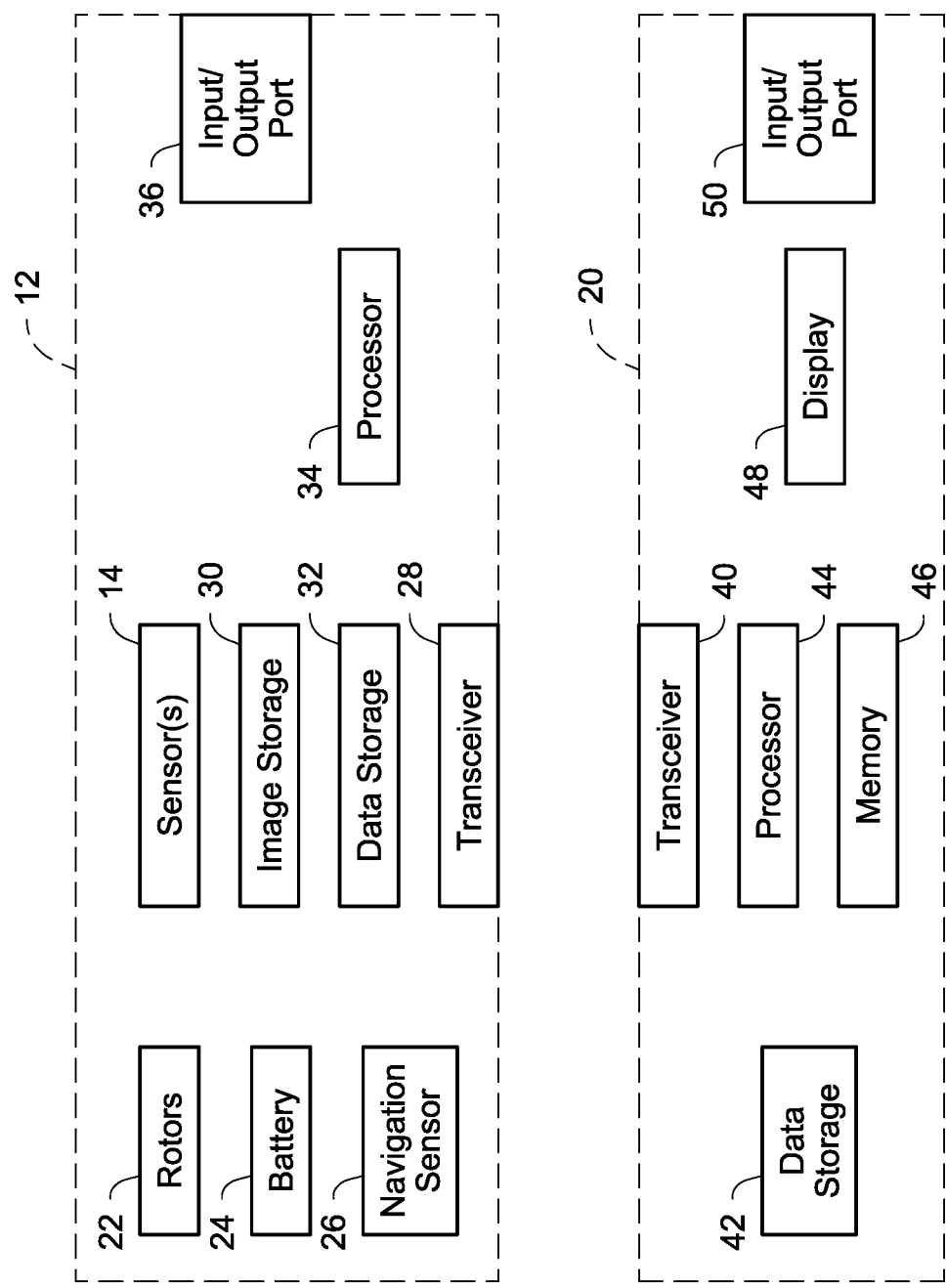

FIG. 3 schematically depicts example components of a UAV described herein together with an example of a system separate from the UAV that can process image data obtained by the UAV.

Figure 4:
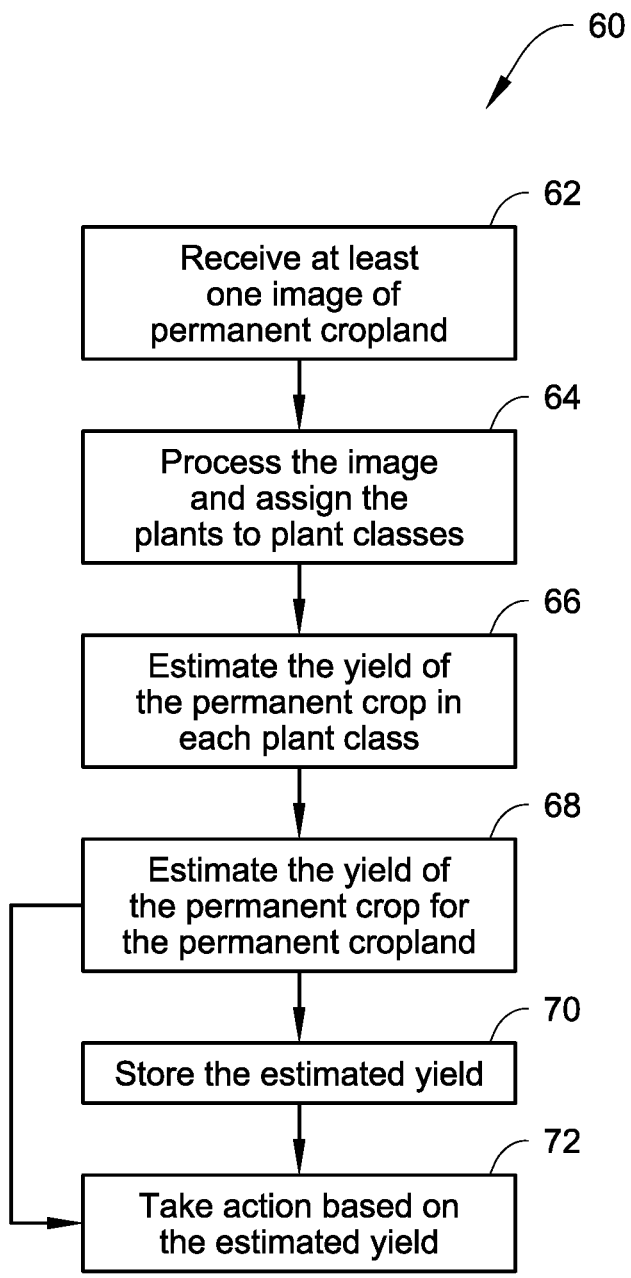

FIG. 4 depicts an example of an analysis method described herein.

Figure 5:
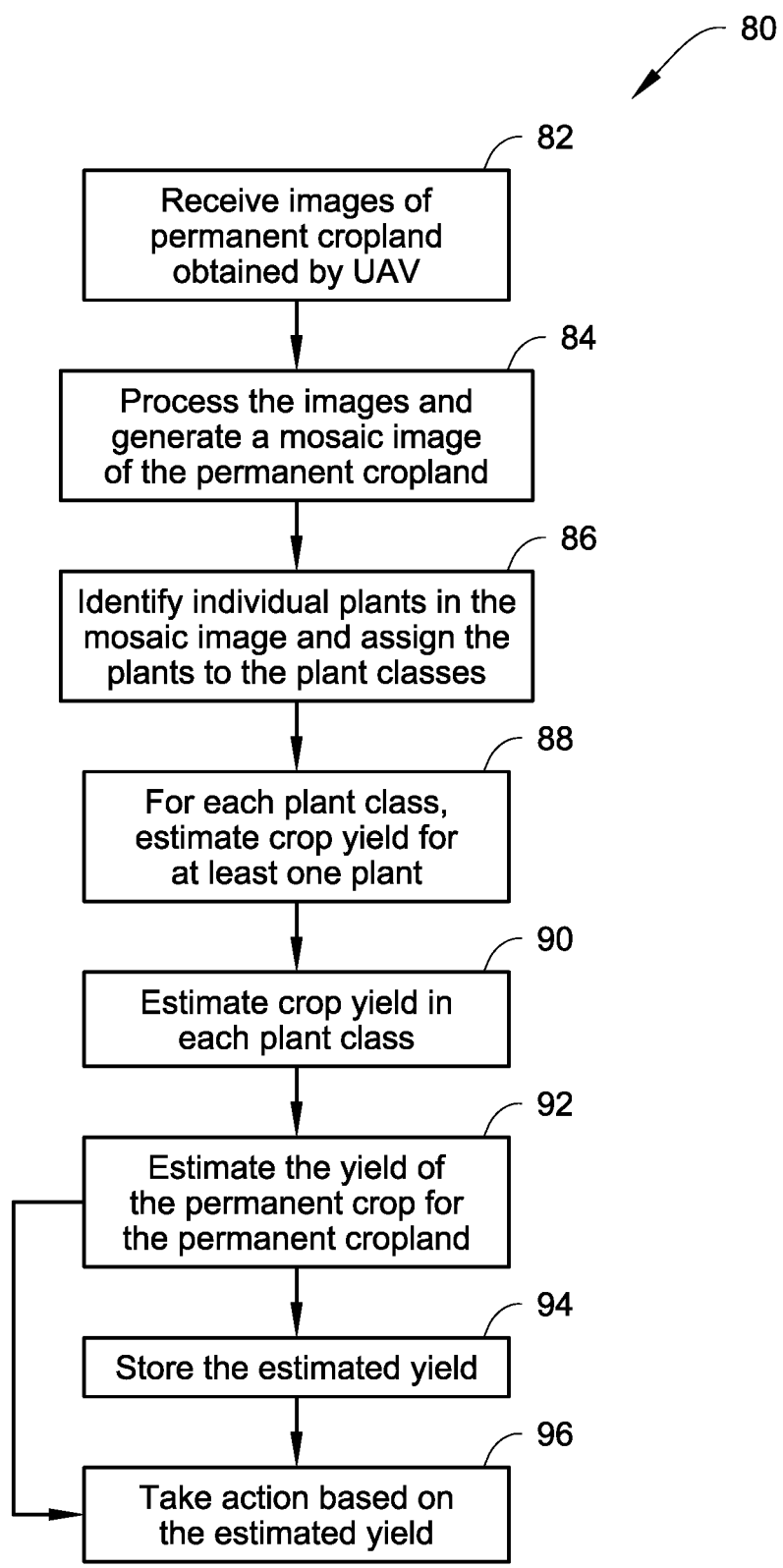

FIG. 5 depicts another example of an analysis method described herein.

Figure 6:
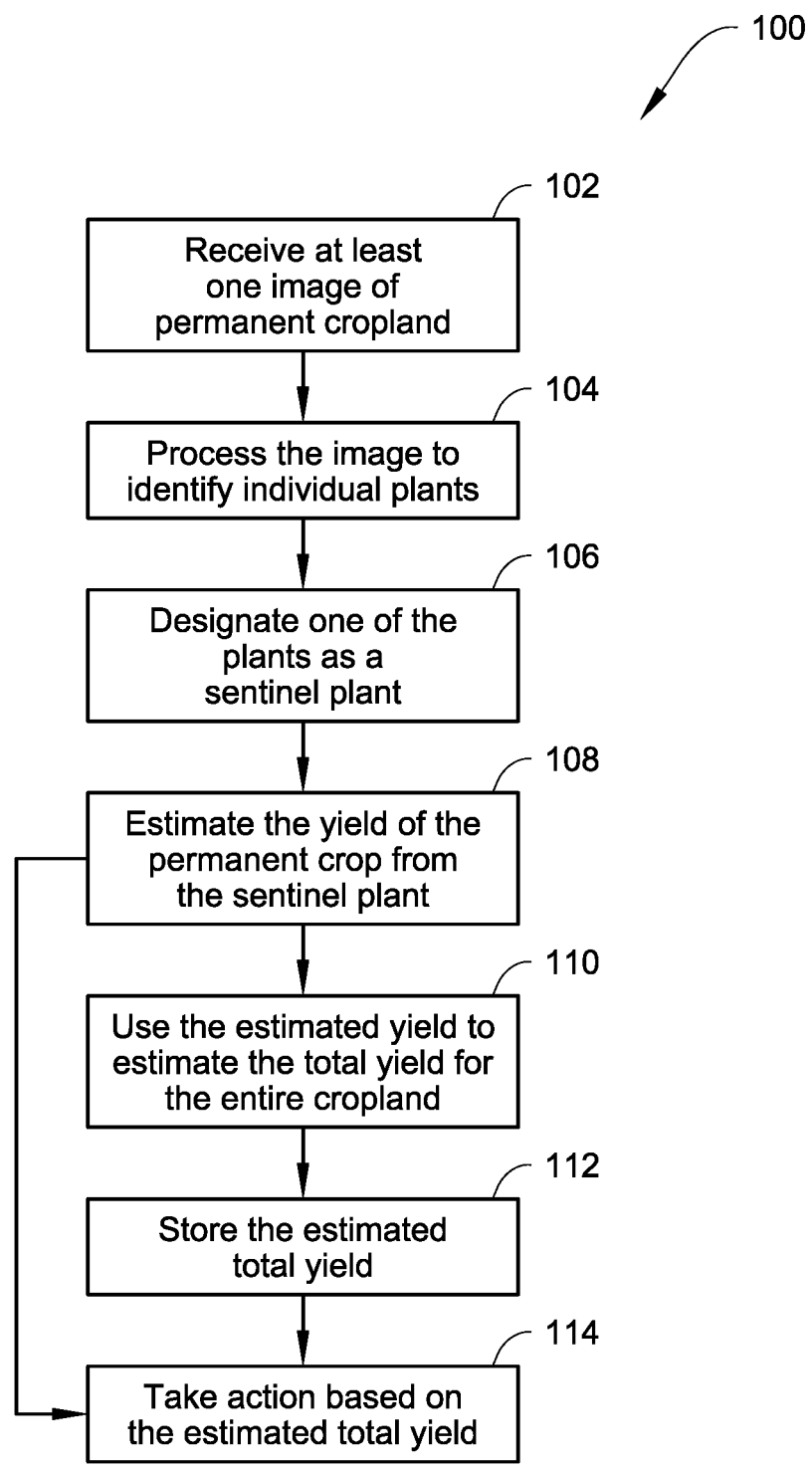

FIG. 6 depicts another example of an analysis method described herein.

Figure 7:
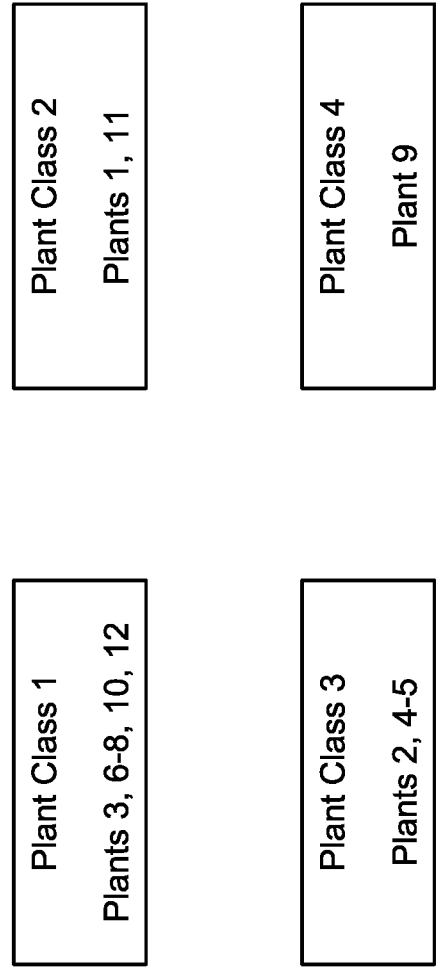

FIG. 7 depicts an example of plant classes.

DETAILED DESCRIPTION

The following is a detailed description of analyzing one or more images to analyze permanent cropland. The images can be obtained from one or more sensors mounted on an aerial vehicle including, but not limited to, unmanned aerial vehicles such as UAVs or a satellite, or a manned aerial vehicle such as an airplane. The analysis of the permanent cropland includes, but is not limited to, analyzing the plants growing in the permanent cropland or analyzing the permanent crops growing on the plants. In one embodiment, the analysis can include estimating a total yield of the permanent crops where the estimated permanent crop yield is more accurate than the estimated yield obtained using traditional methods. Yield as used herein can include estimating a number of the permanent crop, and/or estimating a weight of the permanent crop, and/or estimating a volume (e.g. bushels) of the permanent crop.

As used herein, analyzing the one or more images can include analyzing a single image obtained by the sensor(s) on the aerial vehicle, analyzing each image of a plurality of images obtained by the sensor(s), or analyzing a mosaic image that is produced from a plurality of images obtained by the sensor(s). A single image, whether obtained from the sensor(s) on the aerial vehicle or a mosaic image, may encompass the entire area of the permanent cropland or a portion of the permanent cropland.

As used herein, the term "permanent cropland" refers to land on which plants are used to grow permanent crops. Permanent cropland may also be referred to as an orchard. The term "permanent crops" refers to crops grown on plants which last for many growing seasons rather than being replanted after each harvest. Examples of permanent cropland include, but are not limited to, vineyards on which grape vines grow grapes; orchards in which trees or plants are used to grow fruits such as apples, peaches, pears, apples, oranges, olives and the like; plantations in which bushes or plants are used to grow bananas or other fruits; and orchards in which trees or plants are used to grow nuts including, but not limited to, almonds, pecans, walnuts, and the like.

General examples of permanent crops include, but are not limited to, fruits, nuts, stone fruits/drupes, berries, nut-like gymnosperm seeds, and nut-like angiosperm seeds. Specific examples of permanent crops include, but are not limited to, acorn, almond, angiosperm seeds (nut-like), apple, apricot, araucaria nuts, atherton oak nut, Australian cashew nut, avocado, bananas, beechnut (American & European), bergamot orange, betel, black walnut, brazil nuts, breadnut, buartnut, butternut, canarium, candlenut, cashews, cherry, chestnut, Chilean hazel, Chinese olives, coconut, coffee, eastern black walnut, English walnut, fig, filbert, flaxseed, gabon nut, *Ginkgo biloba*—ginko, ginkgo nuts, grandilla, grapefruit, guava, guinea peanut, heartnut, hickory, Indian almond, jackfruit, Japanese heartnut, Japanese walnut, Johnstone River almond, karuka nuts, key lime, kola (cola) nut, Korean pine nut, kumquat, langsat, lemon, lime, litchi, loquat, luchee, macadamia nut, malabar chestnut, manchurian walnut, mango, medlar, Mexican pine nut, mongongo nut, mulberry, nectarine, nutmeg, olive, orange, palm fruits, palm nuts, papaya, paradise nut (cream nut, monkey pot, sapucaia, castanha-de-sapucaia), peanut tree, pear, pecan, persion, pili nut, pine nut (pinus), piñion nut, pistachio, plum, pomegranate, pomelo, pongamia, quince, rambutan, red bobble nut, sapodilla, saba nut, shorea (borneao tallow nuts), souari, soursop, sugar apple, sweet chestnut, tamarillo, trazel, walnut, yellow walnut, chokeberry (aka choke cherry), juniper, hackberry, red currant, huckleberry, dogwood berries, juneberry, gooseberry, lingon berry, barberry, buffaloberry, rowan.

The aerial vehicle is flown over the permanent cropland that includes a plurality of plants that are actively growing or will be growing permanent crops. The plants are typically, but don't have to be, arranged into ordered rows. As the aerial vehicle is flown over the cropland, one or more sensors on the aerial vehicle capture one or more images of all or a portion of the permanent cropland and the plants thereon that are of interest. The one or more images are then processed/analyzed to estimate the yield of the permanent crop from the permanent cropland. In one embodiment, some or all of the processing/analysis can occur on the aerial vehicle, for example on one or more processors on a sensor system mounted on the aerial vehicle or a processor otherwise disposed on the aerial vehicle. The results of the analysis can then be downloaded from the sensor system on the aerial vehicle or wirelessly transmitted from the sensor system on the aerial vehicle. In another embodiment, the image(s) to be analyzed can be transmitted or downloaded from the sensor system on the aerial vehicle with some or all of the analysis occurring remote from the aerial vehicle.

Figure 1:
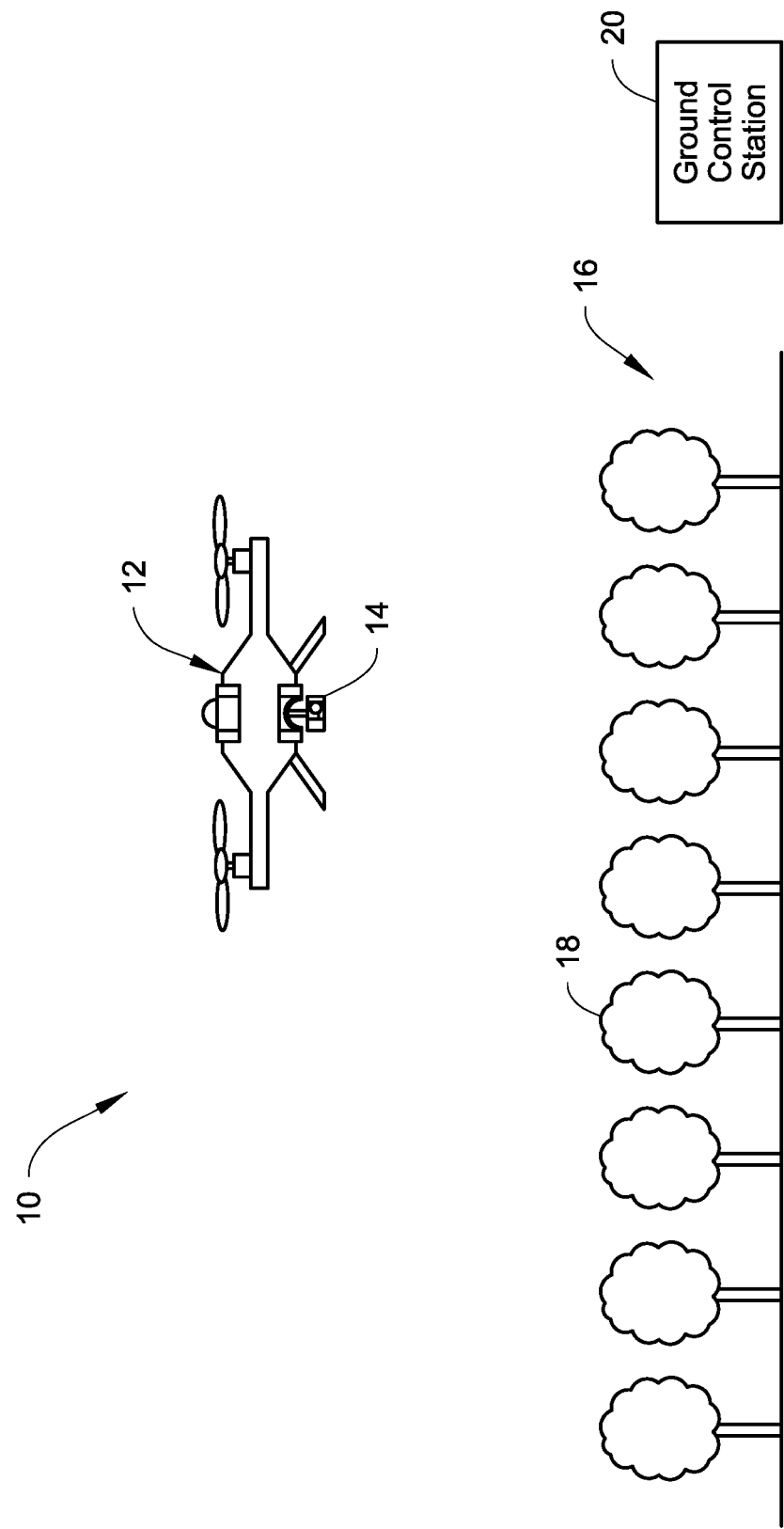
FIG. 1 depicts a UAV flying over permanent cropland.
Figure 2:
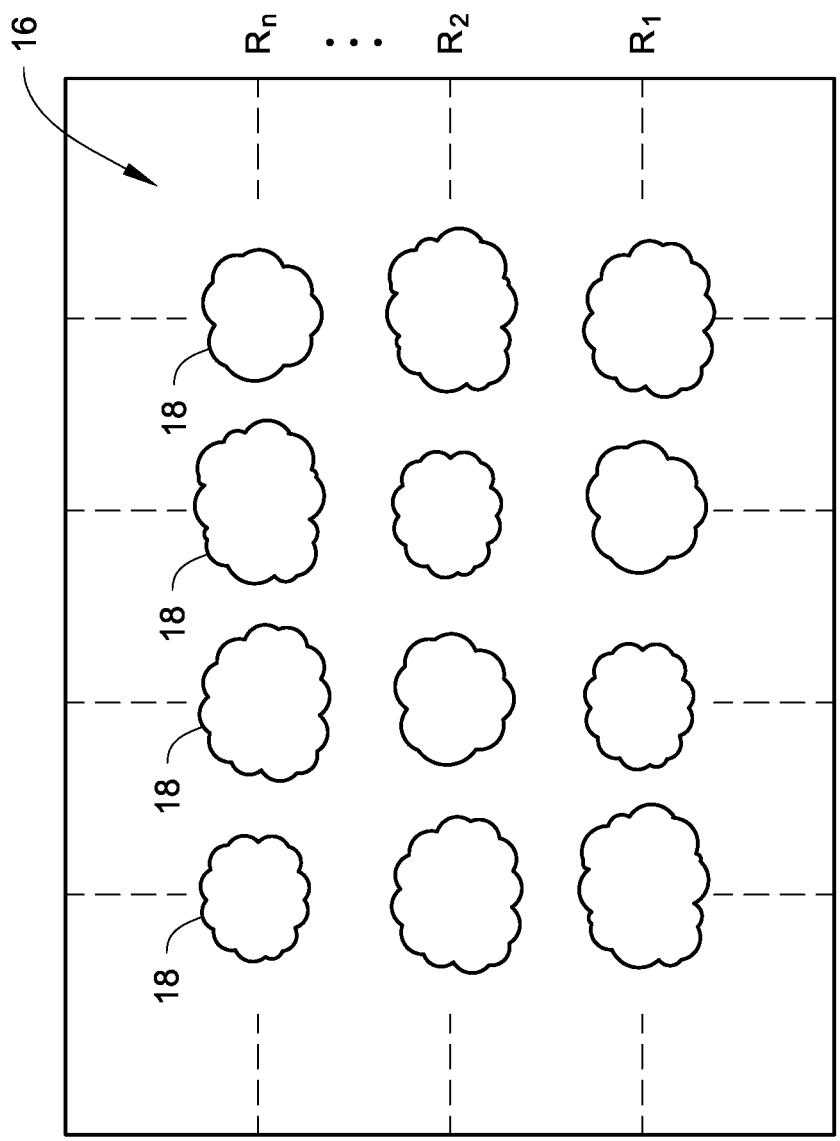
FIG. 2 is a schematic top view of a portion of permanent cropland showing the canopy of each individual plant.

Referring initially to FIG. 1, part of a system 10 described herein is illustrated. The system 10 includes an aerial vehicle 12, in this example depicted as a UAV. In one non-limiting embodiment, the UAV can be a quad-copter or quad-rotor UAV. However, the UAV may alternatively include other types of UAVs including, but not limited to, other type of rotorcraft UAV, a fixed-wing UAV, or another type of UAV. The vehicle 12 includes at least one sensor 14 mounted thereon for capturing images of permanent cropland 16 as the vehicle 12 is flown over the permanent cropland. With reference to FIGS. 1 and 2, the permanent cropland 16 includes a plurality of plants 18 arranged into rows R1, R2, . . . Rn. The plants 18 can be any type of plant that produces a permanent crop that needs to be harvested.

Referring to FIGS. 1 and 3, the system 10 can include the aerial vehicle 12 and a ground control station 20. The vehicle 12 and the station 20 may be in wireless communication with one another using any known conventional wireless communication technique(s). The vehicle 12 can transmit various data to the ground control station 20, for example data obtained from the sensor(s) 14. The data transmitted by the vehicle 12 may also be data relating to the operation of the vehicle 12, such as navigation sensor data, battery level data and the like. The ground control station 20 can also transmit commands to the vehicle 12. The commands can be, for example, navigational/directional commands, commands to turn on/off various sensors, and other commands.

With continued reference to FIGS. 1 and 3, the vehicle 12 can include the sensor(s) 14, one or more rotors or other propulsion mechanisms 22, one or more batteries 24, a navigation sensor 26, and a transceiver 28. The sensor(s) 14 can be one or more multispectral sensors that are part of a sensor system mounted on the vehicle 12 and that capture images of the permanent crops and cropland 16 or portions thereof in particular spectral bands such as, but not limited to, blue, green, red, red edge, infrared, and the like. The images are suitable for use in customized multispectral analytics that can help identify characteristics of the plants that help categorize its crop production. Customized multispectral analytics can include, but is not limited to, determining various indices relating to the permanent crops or the cropland including, but not limited to, Normalized Difference Vegetation Index (NDVI), Normalized Difference Red Edge (NDRE), Visual Atmospheric Resistance Index (VARI), Green Ratio Vegetation Index (GRVI), Green Leaf Index (GLI), Soil Adjusted Vegetation Index (SAVI), and other known indices.

The sensor(s) 14 can also include a conventional camera known in the art for capturing one or more photographic images of the permanent crops or cropland 16 or portions thereof. The camera can be in addition to one or more multispectral sensors. If present, the camera can be a gimballed or fixed position video camera.

The rotor(s) 22 rotates to provide the lift and propulsion for the vehicle 12. The battery 24, which may be rechargeable, provides stored electrical energy for powering the various electrical components of the vehicle 12. The navigation sensor 26 may include an inertial measurement unit (IMU), which may include an accelerometer and gyroscope to output roll, pitch, yaw, acceleration, or approximate velocity of the vehicle 12 calculated based on acceleration. The navigation sensor 26 may include a compass to provide heading or a global navigation satellite system (GNSS), such as the Global Positioning System (GPS) to provide location. In an example, the navigation sensor 26 may include a tightly coupled IMU and GNSS system, where the IMU data is used to reduce noise in the GNSS positioning accuracy and the GNSS data is used to reduce inertial positioning noise (e.g., drift). The transceiver 28 can be any conventional transceiver known in the art for wirelessly transmitting and receiving data/commands. The sensor(s) 14, the one or more rotors 22, the one or more batteries 24, the navigation sensor 26, and the transceiver 28 are each well known in the art.

The sensor system containing the sensor(s) 14 may also optionally include an image storage 30 for storing images obtained by the sensor(s) 14, a data storage 32 for storing other data, one or more processors 34 (for example a CPU or GPU or FPGA) that can process images and/or other data, and an input/output port 36 that can mechanically interface with a suitable mechanical connector for transferring data from or into the sensor system. In some embodiments, the image storage 30 and the data storage 32 can be combined into a single storage device.

With continued reference to FIGS. 1 and 3, the ground control station 20 can include a transceiver 40, a data storage 42, one or more data processors 44, a memory 46 that stores data processing algorithms, a display screen 48, and an input/output port 50. Other elements can also be included on the ground control station 20 such as one or more user inputs which can be, for example, input buttons or inputs on a touchscreen which can be separate from, or incorporated into, the display screen 48. The transceiver 40 can be any conventional transceiver known in the art for wirelessly communicating with the vehicle 12 and/or the sensor(s) 14. The data storage 42 can store data, such as image data received from the sensor(s) 14. The one or more processors 44 can be, for example, a CPU or GPU or a FPGA, that can process images and/or other data obtained by the sensor(s) 14. The display 48 can display one or more images obtained by the sensor(s) 14 and/or display a mosaic image generated from the image(s) obtained by the sensor(s) 14. The input/output port 50 can mechanically interface with a suitable mechanical connector for transferring data from or into the station 20.

Referring to FIG. 4, an example of a yield analysis method 60 is depicted. Some or all of the method 60 can take place on the sensor system containing the sensor(s) 14 and/or elsewhere on the vehicle 12, on the ground control station 20, or at any other remote location. For sake of convenience, the method 60 will be described as being performed away from the vehicle 12, for example on the ground control station 20 or other location remote from the vehicle 12. The method 60 includes receiving at least one image of the permanent cropland at box 62. The image(s) can be obtained by the sensor(s) 14 on the vehicle 12 and the image(s) includes at least some of the plants that are in the permanent cropland. In other embodiments, the image(s) can be obtained from a source other than or in addition to the sensor(s) 14, for example obtained from a ground based sensor. In some embodiments, the image(s) can be multispectral images obtained by the multispectral sensor(s), the image(s) can be photographic image(s) obtained by a camera, or the image(s) can be obtained from both multispectral sensor(s) and a camera.

At box 64, the image(s) is then processed which includes identifying each plant in the image(s) and assigning each plant to a plant class. The identification of each plant and classification of each plant to a plant class is preferably automated and performed automatically using the image processing software used to process the image(s). In other embodiments, the identification and classification is done manually by one or more humans reviewing the image(s).

Referring to FIG. 7, an example of plant classes is illustrated. Each plant class contains the plants from the image(s) that are expected to produce a similar yield of permanent crop per plant. In one embodiment, the yield from each plant can be categorized as high yield, medium yield, low yield. FIG. 7 illustrates 4 total plant classes: Plant Class 1 representing high yield plants; Plant Class 2 representing medium yield plants; Plant Class 3 representing low yield plants; Plant Class 4 representing no yield or indeterminate yield. Other plant categorizations can be based on: new plant (no crop); young plant (a bit of harvestable crop); and mature plants (a lot of harvestable crop). However, a smaller or larger number of plant classes can be used. Each plant class can contain a single plant or multiple plants. In some embodiments, only one plant class using one plant can be used for an entire field.

The classification of each plant into a particular plant class can be based on any available information, obtained from the sensor images and possibly elsewhere, from which one may be able to automatically base a yield estimate of each plant. For example, the classification can be based on a characteristic of the plants including, but not limited to, the height of the plant, the size of the canopy of the plant, the density of the canopy, the health of the canopy, signs of stress, vigor, and/or disease (or lack of signs of stress, vigor and disease) on the plants, the age of the plant, the size (such as diameter) of a trunk of the plant; based on environmental conditions including, but not limited to, soil type, fertility program, irrigation program, elevation of the permanent cropland; grafting information for each plant including, but not limited to, root-stock and scion information; and combinations thereof. In some embodiments, some of the plant characteristics can be determined when the plants are dormant (for example, without leaves), and imaging of the plants can be collected prior to leaves and permanent crop being present. Knowing this information can assist in evaluating canopy size or health when the plants have foliage and/or crops. In some embodiments, a semantic segmentation process can be used to, for each pixel in an image, distinguish vegetation from soil, or weeds from the crops, which can be used to, for example, calculate canopy size of the plants using multispectral band images and/or RBG photographic images. However, other techniques can be used.

Returning to FIG. 4, at box 66 an estimate of the yield of the permanent crop in each plant class is derived. This can be performed by selecting one or more representative plants from each plant class and estimating the yield from each representative plant. Estimating the yield can be performed from the ground without using the image(s) obtained by the UAV. The selection of the representative plants can be based on any one or more techniques that permit yield estimation for the representative plants. For example, the permanent crop can be harvested/picked from each representative plant to determine the yield for each representative plant. In another example, the permanent crop on each representative plant can be manually estimated by one or more human workers at each representative plant counting the permanent crop without picking the permanent crop. In another example, the permanent crop on each representative plant can be estimated with technology including, but not limited to, using image based estimating such as machine learning based object detection. One option for implementing image based estimating is to capture images of the representative plants with a mobile phone or tablet camera, a handheld digital camera, or using a UAV. Another option for estimating yield with technology is to use lidar-based estimating. Estimating the yield can also be performed by measure or estimating the size of each item of permanent crop on the representative plants. In another embodiment, the yield can be estimated visually (for example, a worker with many years of experience can often look at a plant and visually estimate the yield).

Once the yield is estimated for each representative plant from each plant class, at box 68 the permanent crop yield for the entire permanent cropland is estimated. This is achieved by, for each plant class, multiplying the estimated yield of each representative plant by the number of plants in each class to obtain an estimated total yield for each plant class, and then summing the estimated total yields of all of the plant classes. In instances where multiple representative plants are selected in a plant class, the average estimated yield of the representative plants in the plant class can be used in the calculation.

At box 70 in FIG. 4, the estimated permanent crop yield for the entire permanent cropland can be stored in data storage, such as the data storage 42 in FIG. 3. Other data, such as plant classes and an identification of each plant in each one of the plant classes, the representative plants for each plant class, and the estimated yield of each representative plant, can be stored as well.

At box 72, one or more actions can be taken based on the estimated permanent crop yield for the entire permanent cropland and/or based on other data generated in the method 60. Examples of actions include, but are not limited to, allocate crop collection bins for harvest planning; allocating personnel for harvesting the crop; establish harvest priority order for harvesting teams; generate a prescription for treatment of the plants or harvest of the crop; generate an alert relating to quality concerns that can be addressed with agronomic practices; make marketing decisions such as selling futures; generate an alert for managing marketing decisions; calculate return on investment of management practices to evaluate financial viability of a practice or application; plan transportation and/or processing based upon demand, final delivery location and other logistics; report revenue projections to shareholders and investors; identify optimum root stock and scion configurations to achieve highest yield, highest profitability, and/or highest disease resistance. In another embodiment, instead of storing the estimated yield, step 70 can be skipped and the one or more actions at box 72 can be taken once the yield is estimated at box 68.

FIG. 5 illustrates another example of a yield analysis method 80. Some or all of the method 80 can take place on the sensor system containing the sensors(s) 14 or elsewhere on the vehicle 12, on the ground control station 20, or at any other remote location. For sake of convenience, the method 80 will be described as being performed away from the vehicle 12, for example on the ground control station 20 or other location remote from the vehicle 12. The method 80 includes receiving images of the permanent cropland at box 82. The images can be obtained by the sensor(s) 14 on the vehicle 12 and the images includes at least some of the plants that are in the permanent cropland. In other embodiments, the images can be obtained from a source other than the sensor(s) 14, for example obtained from a ground based sensor. In some embodiments, the images can be obtained solely by the multispectral sensor(s), the images can be photographic images obtained by a camera, or the images can be obtained from both multispectral sensors and a camera.

Thereafter, the images are processed and a mosaic image of the permanent cropland is generated at box 84. Generating a mosaic image from aerial images is known in the art. An example of generating a mosaic image from aerial images is disclosed in U.S. Pat. No. 10,402,942, titled Multiple Georeferenced Aerial Image Crop Analysis and Synthesis, the entire contents of which are incorporated herein by reference.

At box 86, individual plants in the mosaic image are identified and each plant is assigned to a plant class. The identification of each plant, the plant classes, and the classification of each plant to a plant class can be the same as box 64 in the method 60 in FIG. 4. At box 88, an estimate of the yield of the permanent crop for at least one plant, such as a representative plant, in each plant class is derived. This can be performed in the same manner as described above for the method in FIG. 4. Thereafter, for each plant class, the total estimated crop yield for the plant class determined at box 90, for example in the same manner as described above for the method in FIG. 4.

Once the yield is estimated for each plant class, at box 92 the permanent crop yield for the entire permanent cropland is estimated. This is achieved by summing the estimated total yields of all of the plant classes. At box 94 in FIG. 5, the estimated permanent crop yield for the entire permanent cropland can be stored in data storage, such as the data storage 42 in FIG. 3, and at box 96, one or more actions can be taken based on the estimated permanent crop yield for the entire permanent cropland and/or based on other data generated in the method 80. In another embodiment, instead of storing the estimated yield, step 94 can be skipped and the one or more actions at box 96 can be taken once the yield is estimated at box 92.

FIG. 6 illustrates another example of a yield analysis method 100. Some or all of the method 100 can take place on the sensor system containing the sensors(s) 14 or elsewhere on the vehicle 12, on the ground control station 20, or at any other remote location. For sake of convenience, the method 100 will be described as being performed away from the vehicle 12, for example on the ground control station 20 or other location remote from the vehicle 12. The method 100 includes receiving at least one image of the permanent cropland at box 102. The image(s) can be obtained by the sensor(s) 14 on the vehicle 12. In other embodiments, the image(s) can be obtained from a source other than the sensor(s) 14, for example obtained from a ground based sensor. In some embodiments, the image(s) can be obtained solely by the multispectral sensor(s), the image(s) can be photographic images obtained by a camera, or if multiple images are used the images can be obtained from both multispectral sensors and a camera.

Thereafter, the image(s) is processed at box 104 to identify individual plants. Thereafter, at box 106, one of the identified individual plants is designated as a sentinel plant (i.e. a representative plant). As used herein, a sentinel plant is a plant among the identified plants that is most likely to have a representative or average crop yield for the area of the cropland contained in the image or among a block or section of the image. A yield of the permanent crop from the sentinel plant is then estimated at box 108, for example using any estimation technique described herein. At box 110, the estimated yield of the permanent crop from the sentinel plant is then used to estimate the total yield of the permanent crop for the permanent cropland by multiplying the estimated yield by the number of plants. The estimated total yield of the permanent crop for the permanent cropland can then be stored in at least one non-transitory computer readable storage medium at box 112, and at box 114, one or more actions can be taken based on the estimated permanent crop yield for the entire permanent cropland and/or based on other data generated in the method 100. In another embodiment, instead of storing the estimated yield, step 112 can be skipped and the one or more actions at box 114 can be taken once the yield is estimated at box 110.

In each of the methods 60, 80, 100 a byproduct of identifying each plant in the image(s) is a count of the total number of plants on the permanent cropland. Therefore, the methods described herein can also be used to count the plants on the permanent cropland using the image(s). That plant count can then be compared to a manual count or an expected count.

In some embodiments, the plants may have two sets of permanent crops at the same time. For example, orange trees can have one set of oranges to be harvested in the current harvesting season and a second set of oranges that will not be ready for harvesting until the next harvesting season. In such instances, the methods described herein allow separate yield estimates to be generated for each set of oranges or other permanent crops.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of estimating yield of permanent cropland containing a plurality of plants of the same type that generate a permanent crop of the same type, comprising:
   receiving at least one image of the permanent cropland;
   processing the at least one image and assigning the plants of the same type to plant yield classes;
   estimating a yield of the permanent crop in each plant yield class;
   using the estimated yield of the permanent crop in each plant yield class to estimate the yield of the permanent crop for the permanent cropland;
   storing the estimated yield of the permanent crop for the permanent cropland in at least one non-transitory computer readable storage medium.

2. The method of claim 1, wherein receiving at least one image of the permanent cropland comprises receiving a plurality of images of the permanent cropland obtained by one or more multispectral sensors on an aerial vehicle flown over the permanent cropland, and generating a mosaic image of the permanent cropland from the plurality of images; and further comprising processing the mosaic image and assigning the plants appearing in the mosaic image to the plant yield classes.

3. The method of claim 1, wherein estimating the yield of the permanent crop in each plant yield class comprises:
   for each plant yield class:
      identifying at least one plant in the plant yield class and estimating the permanent crop yield for the at least one plant;
      multiplying the estimated permanent crop yield for the at least one plant by the number of plants in the plant yield class.

4. The method of claim 1, wherein the plants comprise fruit, berry or nut producing trees; fruit or berry producing vines; or fruit, nut or berry producing plants.

5. The method of claim 1, wherein the permanent crop comprises fruit, nuts, stone fruits, berries, nut-like angiosperm seeds, or nut-like gymnosperm seeds.

6. The method of claim 1, further comprising:
   using the estimated yield of the permanent crop for the permanent cropland to allocate collection bins to the permanent cropland, or generating a prescription for treatment and/or harvesting of the plants and/or of the permanent crop.

7. The method of claim 1, wherein estimating the yield of the permanent crop in each plant yield class comprises one of the following:
   manually estimating the yield in each plant yield class;
   estimating the yield in each plant yield class using an automated technique;

estimating the yield in each plant yield class using human intuition.

8. The method of claim 1, wherein assigning the plants to the plant yield classes is based on at least one characteristic of each plant.

9. The method of claim 8, wherein the at least one characteristic is one or more of the following: plant height; plant canopy size; plant canopy density; plant canopy health; signs of plant stress, plant vigor and/or plant disease; lack of signs of plant stress, plant vigor and/or plant disease; plant age; and plant trunk size.

10. The method of claim 1, wherein assigning the plants to the plant yield classes is based on at least one environmental condition.

11. The method of claim 10, wherein the at least one environmental condition is one or more of the following: soil type; fertility program; irrigation program; and elevation of the permanent cropland.

12. A method of estimating yield of permanent cropland containing a plurality of plants that generate a permanent crop, comprising:
   receiving at least one image of the permanent cropland;
   processing the at least one image to identify individual ones of the plants;
   designating one of the identified plants as a sentinel plant;
   estimating a yield of the permanent crop from the sentinel plant;
   using the estimated yield of the permanent crop from the sentinel plant to estimate the yield of the permanent crop for the permanent cropland;
   storing the estimated yield of the permanent crop for the permanent cropland in at least one non-transitory computer readable storage medium.

13. The method of claim 12, wherein receiving at least one image of the permanent cropland comprises receiving a plurality of images of the permanent cropland obtained by one or more multispectral sensors on an aerial vehicle flown over the permanent cropland, and generating a mosaic image of the permanent cropland from the plurality of images; and further comprising processing the mosaic image and designating the sentinel plant from the mosaic image.

14. The method of claim 12, wherein the plants comprise fruit, berry or nut producing trees; fruit or berry producing vines; or fruit, nut or berry producing plants.

15. The method of claim 12, wherein the permanent crop comprises fruit, nuts, stone fruits, berries, nut-like angiosperm seeds, or nut-like gymnosperm seeds.

16. The method of claim 12, further comprising:
   using the estimated yield of the permanent crop for the permanent cropland to allocate collection bins to the permanent cropland, or generating a prescription for treatment and/or harvesting of the plants and/or of the permanent crop.

17. The method of claim 12, wherein estimating the yield of the permanent crop from the sentinel plant comprises one of the following:
   manually estimating the yield;
   estimating the yield using an automated technique;
   estimating the yield using human intuition.

18. A method of estimating yield of a permanent cropland containing a plurality of plants of the same type that generate a permanent crop of the same type, comprising:
   receiving a plurality of images of the permanent cropland obtained by one or more multispectral sensors on an aerial vehicle flown over the permanent cropland;
   processing the plurality of images and generating a mosaic image of the permanent cropland from the plurality of images;
   identifying individual ones of the plants in the mosaic image and assigning the plants of the same type to plant yield classes;
   for each plant yield class, identifying at least one plant in the plant yield class and estimating the permanent crop yield for the at least one plant;
   for each plant yield class, estimating a yield of the permanent crop in the plant class using the estimated permanent crop yield for the at least one plant in the plant yield class;
   using the estimated yield of the permanent crop in each plant yield class to estimate the yield of the permanent crop for the permanent cropland;
   storing the estimated yield of the permanent crop for the permanent cropland in at least one non-transitory computer readable storage medium.

19. The method of claim 18, wherein the plants comprise fruit, berry or nut producing trees; fruit or berry producing vines; or fruit, nut or berry producing plants.

20. The method of claim 18, wherein the permanent crop comprises fruit, nuts, stone fruits, berries, nut-like angiosperm seeds, or nut-like gymnosperm seeds.

21. The method of claim 18, further comprising:
   using the estimated yield of the permanent crop for the permanent cropland to allocate collection bins to the permanent cropland, or generating a prescription for treatment and/or harvesting of the plants and/or of the permanent crop.

22. The method of claim 18, wherein estimating the yield of the permanent crop in each plant yield class comprises one of the following:
   manually estimating the yield in each plant yield class;
   estimating the yield in each plant yield class using an automated technique;
   estimating the yield in each plant yield class using human intuition.

23. The method of claim 18, wherein the plant yield classes are based on a plant characteristic or an environmental condition.

24. The method of claim 18, wherein the plant yield classes are based on one or more of the following: plant height; plant canopy size; plant canopy density; plant canopy health; plant stress; plant age; plant trunk size; plant root-stock; plant scion; soil type; elevation; fertility program; and irrigation program.

* * * * *